(12) United States Patent
Schroeter

(10) Patent No.: US 7,449,046 B2
(45) Date of Patent: Nov. 11, 2008

(54) METHOD AND ARRANGEMENT FOR PURIFYING GASES FED TO A FUEL CELL BY REMOVING OPERATIONAL UNFAVORABLE CONSTITUENTS

(75) Inventor: Dirk Schroeter, Winnenden (DE)

(73) Assignee: Daimler AG, Stuttgart (DE)

( * ) Notice: Subject to any disclaimer, the term of this patent is extended or adjusted under 35 U.S.C. 154(b) by 534 days.

(21) Appl. No.: 10/519,996

(22) PCT Filed: May 20, 2003

(86) PCT No.: PCT/EP03/05272

§ 371 (c)(1),
(2), (4) Date: Sep. 13, 2005

(87) PCT Pub. No.: WO2004/006374

PCT Pub. Date: Jan. 15, 2004

(65) Prior Publication Data

US 2006/0096456 A1 May 11, 2006

(30) Foreign Application Priority Data

Jul. 5, 2002 (DE) .................. 102 30 283

(51) Int. Cl.
*B01D 53/02* (2006.01)
*H01M 8/04* (2006.01)

(52) U.S. Cl. .................. 95/21; 95/278; 96/109; 96/114; 96/134; 96/143; 55/283

(58) Field of Classification Search ............ 96/111, 96/109, 113, 114, 134, 135, 143; 95/1, 8, 95/19, 21, 148, 278; 55/385.1, 282, 283; 429/13, 19, 22

See application file for complete search history.

(56) References Cited

U.S. PATENT DOCUMENTS

| 4,898,601 | A  | * | 2/1990  | Casey ..................... 55/341.1 |
| 5,595,949 | A  | * | 1/1997  | Goldstein et al. ............ 502/20 |
| 5,885,727 | A  |   | 3/1999  | Kawatsu |
| 5,944,878 | A  |   | 8/1999  | Lindhe |
| 6,316,134 | B1 |   | 11/2001 | Cownden et al. |
| 6,432,177 | B1 | * | 8/2002  | Dallas et al. .................. 96/132 |
| 6,444,016 | B2 | * | 9/2002  | Oshima et al. ............... 96/111 |
| 6,689,194 | B2 | * | 2/2004  | Pratt et al. .................... 95/139 |
| 6,797,027 | B2 | * | 9/2004  | Stenersen et al. .......... 55/350.1 |
| 2001/0028965 | A1 |   | 10/2001 | Boneberg et al. |

FOREIGN PATENT DOCUMENTS

DE        44 12 450 A1     10/1995

(Continued)

OTHER PUBLICATIONS

*International Journal of Hydrogen Energy*, vol. 21, No. 6, pp. 497-505, 1996 entitled "Development of a Hybrid Fuel Cell/Battery Powered Electric Vehicle" by M. Nadal et al.

Primary Examiner—Frank M Lawrence
(74) Attorney, Agent, or Firm—Crowell & Moring LLP

(57) ABSTRACT

A method and an arrangement are provided for purifying gases which are fed to a fuel cell for operation. A filter system, which is designed to separate out particulates and polluting gases, is arranged in a feed passage for the respective gas.

21 Claims, 1 Drawing Sheet

FOREIGN PATENT DOCUMENTS

| | | |
|---|---|---|
| DE | 199 02 219 C1 | 6/2000 |
| DE | 199 62 947 A1 | 7/2001 |
| DE | 101 10 169 A1 | 9/2001 |
| DE | 101 07 712 A1 | 9/2002 |
| EP | 0 476 610 A | 3/1992 |
| JP | 60-054177 A | 3/1985 |
| WO | WO 01/03212 A2 | 1/2001 |
| WO | WO 02/22234 A2 | 3/2002 |
| WO | WO 02/054521 A1 | 7/2002 |

\* cited by examiner

METHOD AND ARRANGEMENT FOR PURIFYING GASES FED TO A FUEL CELL BY REMOVING OPERATIONAL UNFAVORABLE CONSTITUENTS

BACKGROUND AND SUMMARY OF THE INVENTION

The invention relates to a method and an arrangement for purifying the gases that are to be fed to a fuel cell for operation by removing constituents which are unfavorable to the fuel cell operation.

On account of their high efficiency and the low levels or absence of pollutant emissions, fuel cells are also used in electric vehicles. By way of example, an electric vehicle is known which has a driving motor, a fuel cell and a fuel tank, a water store, an evaporator and a reformer. The fuel tank contains methanol which, together with water from the water store, is converted into the gaseous state in the evaporator and is then passed to the reformer, in which substantially hydrogen, carbon dioxide and carbon monoxide are formed with heat being supplied by a catalytic burner. The carbon monoxide can be oxidized with an oxidizing agent. The hydrogen-containing fuel gas from the reformer is fed to the fuel cell by way of a compressor; the fuel cell comprises a fuel cell stack in which a multiplicity of individual fuel cell modules are integrated. Humidified air is fed to the fuel cell by a further compressor. Electrical energy for the electric driving motor is generated in the fuel cell from the hydrogen and from the oxygen of the air (DE 44 12 450 A1).

Membrane fuel cells, which in each case have a proton-conducting ion exchange membrane made from a polymer material, e.g. fluorinated resin, with a very good electrical conductivity in the moist state, are also used in electric vehicles. The membrane surface is covered with a catalyst. On one side, the electrolyte membrane is connected to a gas-permeable anode, and on the other side, it is connected to a gas-permeable cathode. A ribbed, gas-impermeable plate adjoins the anode; the cavities between the ribs of this plate serve to supply the oxidizing gas, e.g. air, with an oxygen content. A gas-impermeable ribbed plate likewise adjoins the cathode, and its cavities between the ribs are used to supply the gaseous fuel, e.g. the hydrogen-containing gas. When the fuel cell is operating, the electrolyte membrane is moistened by the water of reaction and the humidity in the gases supplied.

A fuel cell in a fuel cell system requires sufficiently purified gases and/or gas mixtures, both with regard to the fuel gas and with regard to the oxidizing gas, for it to operate if the original gas contains constituents which have an adverse effect on the mode of operation of the fuel cell. In this context, the term fuel cell is to be understood as meaning both an individual fuel cell module with the structure as described above and a stack of fuel cell modules of this type, which can be connected in parallel and/or in series. If the oxidizing gas used is air, which is drawn in from the atmosphere, it is generally necessary to carry out a purification step. When using hydrogen, which is taken from a tank or is generated from a liquid fuel, it is often the case that there are no disruptive constituents in the gas, and consequently there is no need for any purification.

WO 02/22234 A2, which forms the generic document, discloses an air filter system for low-temperature catalytic processes for fuel cells. In this system, a very wide range of particles and gases/vapors are filtered out of the incoming air. The filters can be divided into physical or particulate filters and chemical filters. The filters are connected in series in a housing. If the concentration of a pollutant in the incoming air drops below a certain concentration, the chemical filter is spontaneously regenerated through desorption.

The invention is based on the problem of providing a method and an arrangement for eliminating contaminating substances from the gases for operation of a fuel cell before the gases are fed into the fuel cell.

In a method of the type described above, the object is achieved, according to the invention, by the fact that: (a) the gas(es) are passed across a filter system which is designed both to separate off particulates and to remove constituents in gas and vapor form which have a damaging effect on operation of the fuel cells, and (b) the gas(es) are fed to the fuel cell on leaving the filter system. In this case, the gas(es) are passed across a filter system which can be regenerated and is monitored on the basis of criteria indicating a drop in the filter action and that the regeneration should be carried out, with a message being generated when these criteria are reached. The regeneration is carried out when the fuel cell is inoperative. This makes it possible to avoid damage to the fuel cell in the event of spontaneous releases of pollutants during regeneration.

The method according to the invention removes not only particulates, such as dust and carbon particles, but also further constituents of the gas, such as polluting gases, aerosols, organic substances, such as algae, spores, bacteria and viruses, from the gas or gases, which are also referred to below as reaction gases, although they may comprise a mixture of gases, not all of which react in the fuel cell or contribute to the generation of electric power. The purification of the gas or gases makes it possible to lengthen the operating time or service life of the fuel cell.

In an arrangement of the type described above, the object is achieved, according to the invention, by virtue of the fact that a filter system is arranged at a location in the gas-carrying passage for feeding the gas to be purified to the fuel cell, which filter system separates out both particulates and constituents in gas or vapor form, which have a damaging effect on operation of the fuel cell. In this case, the gas(es) are passed across a filter system which can be regenerated and can be monitored on the basis of criteria indicating a drop in the filter action and the execution of the regeneration; a message can be generated when these criteria are reached. The purification of the respective reaction gas using the filter system prevents impurities from being deposited in the feed passages, in delivery devices and in the fuel cell itself, thereby gradually causing the function of the fuel cell to deteriorate, or prevents polluting gases from causing undesirable reactions in the fuel cell.

In an expedient embodiment, the filter system has a first filter for particulates, downstream of which there is a second filter with a substance for taking up and binding pollutants in gas or vapor form. Dry filters made from plastic, glass fiber, paper with a high level of dedusting can be used as the first filter and may, for example, have a labyrinth-like structure. The second filter includes, in particular, porous substances for taking up and physically or chemically binding gases or vapors at the surface. Examples of substances of this type include activated carbon or kieselguhr.

In another expedient embodiment, the filter system comprises a unit in which a dry filter for particulates and a substance for taking up and binding gases or vapors at its surface are arranged together. Therefore, the filter system combines the functions of particulate separation and removal of polluting gases. It is expedient for the particulate filter to include a substance for binding and/or separating off gases, which substance is arranged on a material for separating out particulates or is self-supporting or forms a bulk bed.

In one preferred embodiment, the filter system is designed such that it can be regenerated, it being possible for the regeneration to be triggered by an actuating element. This makes it possible to prevent the regeneration from being triggered spontaneously, e.g. when the fuel cell is operating, which can lead to high levels of pollutants being emitted and therefore to damage to the fuel cell. The regeneration of the first filter can be carried out, for example, using compressed air, whereas the regeneration of the second filter can be effected by increasing the temperature, since the adsorption is lower at a higher temperature than at a lower temperature.

It is advantageous if the filter system is arranged in the gas-carrying passage for the oxidizing gas upstream of the gas inlet of a compressor. The gas-carrying passage may be arranged inside or outside the fuel cell system to which the fuel cell belongs.

To establish the need for regeneration or filter maintenance with regard to particulate separation, in particular, the pressure difference between the pressure upstream and downstream of the filter system is compared with a predeterminable limit value, with a message being generated if the latter is exceeded.

With regard to the adsorption of pollutants, the need to regenerate or carry out maintenance on the filter can be established using one or more gas or pollutant sensors downstream of the filter system, which are set to measure the pollutants which are to be separated off. The measured values from the sensors are compared with a limit value in each case, with a message being generated if the latter is exceeded.

BRIEF DESCRIPTION OF THE DRAWINGS

The invention is described in more detail below on the basis of an exemplary embodiment illustrated in the drawings, from which further details, features and advantages will emerge. In the drawings.

DETAILED DESCRIPTION OF THE DRAWINGS

Figure 1:
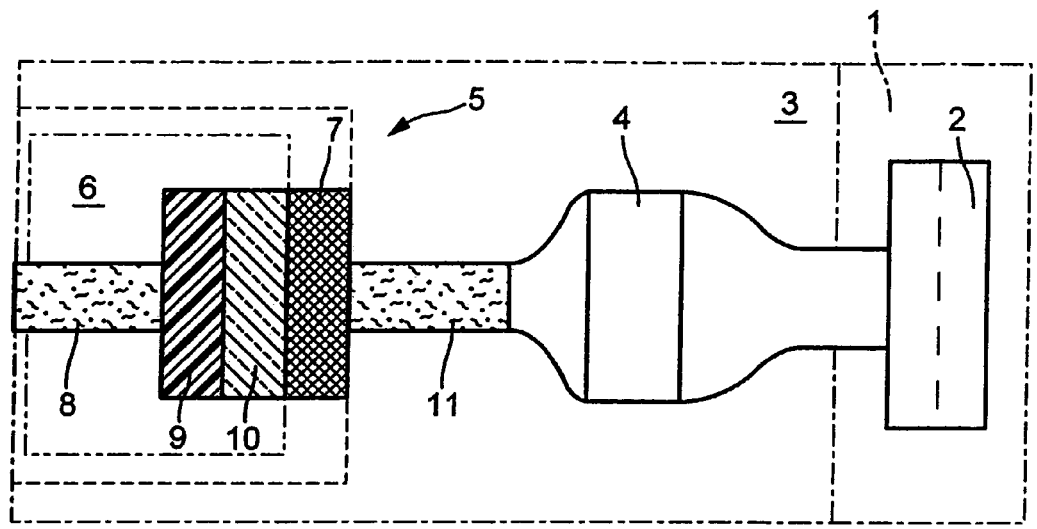
FIG. 1 shows a fuel cell system having a filter system for removing contaminating constituents contained in the gases to be fed to a fuel cell, in the form of a diagrammatic, partially sectional illustration.

A fuel cell system 1, which, in a manner known per se, includes a fuel cell 2, for example of the type having an electrolyte membrane, and further components, which are not shown in the drawing, such as a fuel tank, a water store, an evaporator, a reformer and a control unit, also includes at least one apparatus 3 for sucking in and compressing a gas. This gas is, for example, air, the oxygen in which represents the oxidizing gas which in the fuel cell 2 reacts with the gaseous fuel to generate electrical energy. The gaseous fuel is, for example, hydrogen.

The apparatus 3 includes a compressor 4, which sucks in and compresses the air. The compressed air passes to the fuel cell 2 via passages (not shown in more detail) and, if appropriate, a control or metering valve. The compressor 4 used is, for example, a centrifugal compressor, which is driven by an electric motor (not shown). On account of the relatively high efficiency and low emission of pollutants, fuel cell systems are also used in mobile apparatuses, such as motor vehicles. Small component dimensions and low weights are of importance in these applications.

The apparatus 3 also includes a filter system 5, which is used to purify the gas sucked in by the compressor 4. The filter system 5 is a multi-stage combination filter having a first filter 6, which is used to separate particulates out of the intake air stream, and a second filter 7, which is used to separate certain gases, aerosols and vapors out of the intake air stream. The first filter 6 has a plurality of filter sections. A first filter section 8, which is designed, in particular, as a porous intake passage, acts as a coarse filter for separating out particulates, such as carbon particles or dust. A second filter section 9 operates as a fine filter for particulate separation, for example, for removing organic substances, such as pollen, and diesel carbon particulates in the intake air. If air which is particularly free of dust and particulates is to be generated, a third filter section 10 in the form of an ultrafine filter is provided and is used to separate out, for example, bacteria, viruses and spores. The filter sections 8, 9, 10 are, for example, dry filters. Whereas the filter section 8 may consist of a textile fabric, the filter sections 9 and 10 are composed of labyrinth-like cells, which consist of plastic, glass fiber, paper or textiles. A nonwoven design is also possible.

The second filter 7, the outlet opening of which is connected to the compressor 4 through a gas-carrying passage 11, directly adjoins the first filter 6. The second filter 7 separates out gases which interfere with operation of the fuel cell 2 and are referred to below as polluting gases. Adsorbents, such as activated carbon and kieselguhr, which can take up and bind gases and vapors at their surface, can be used to separate out the polluting gases. The air, which is sucked in by the compressor 4, leaves the second filter 7 as a clean gas.

A sequence of the filter functions which differs from that described above is also possible. The sequence depends on the substances/particulates to be filtered out and the specific structure of the filter system 5. In addition to the separation or binding of the polluting gases by adsorbents or other suitable substances, it is also possible for the polluting gases to be guided out of the air supply system.

Mechanical means, such as those referred to above in connection with the particulates, or chemical, electrostatic or optical methods, which are known per se, can be used for the filtering. A combination of these methods is also possible. In the case of optical filtering methods, for example, UV or IR rays are used.

The combination of an electrostatic filter with ionization with filters made of fibrous substances in front of and/or behind it is also expedient, so that the electrostatic filter is acted on uniformly and relatively large particles, which have not been separated out in the electrostatic filter or are entrained again, are removed from the air stream.

Figure 2:
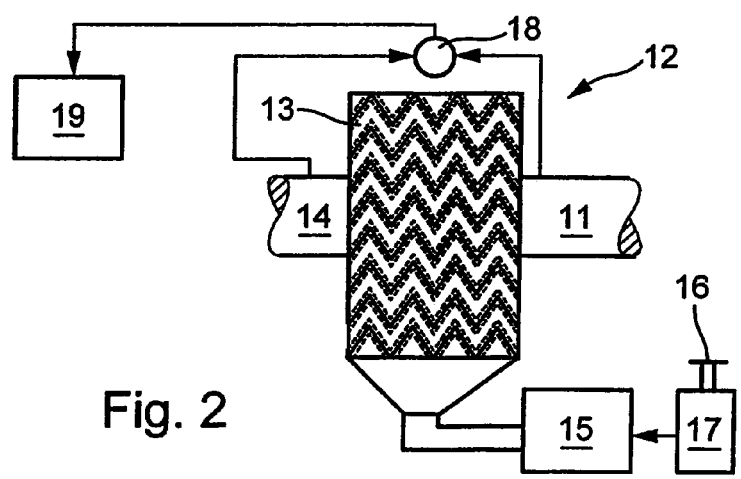
FIG. 2 shows another embodiment of a filter system for the fuel cell system illustrated in FIG. 1.

FIG. 2 diagrammatically depicts a sectional view through a filter system 12, which includes both the elements for particulate separation and for the physical and/or chemical binding of polluting gases, aerosols and vapors, in a single unit. A porous substance for binding or separating off gases is arranged on a carrier material 13 in the form of a labyrinth of cells of fibers. The porous substance on the carrier material 13 is represented by dots (not shown in more detail) in FIG. 2. The substance may be self-supporting or may also form a bulk bed. The filter system 12 is arranged between an intake passage 14 and the gas-carrying passage 11 leading to the compressor 4.

It is possible to use a filter system that can be regenerated. The filter system 12 diagrammatically represents one such system. Compressed air, which originates, for example, from a compressed air generator 15 connected to the filter system 12, can be used for the regeneration in order to remove the particulates which have been separated out. Gases which have been bound by the substance can be released by heating the filter system 12 in order to regenerate the filter system 12. The regeneration requires additional devices, such as the blocking of the gas-carrying passage 11 and the opening of apertures for discharging the particulates and gases released. These additional devices are not shown in FIG. 2.

The regeneration is expediently carried out while the fuel cell 2 is inoperative. To avoid spontaneous emissions of pollutants from the filter system during regeneration, automatic regeneration is not provided for. There is a control unit 17, which can be acted on by an input element, e.g. button 16, and which determines the sequence of regeneration. The control unit 17 is caused to initiate and carry out the filter regeneration through actuation of the button 16.

It is also possible for some or all of the filter system to be designed such that it cannot be regenerated and for the parts or the filter system to be replaced during maintenance.

The accumulation of particulates causes the pressure difference across the filter systems 5 and 12 to rise. The pressure difference can be measured using a device, e.g. manometer 18, and the measured value can be compared with a predeterminable limit value; when this limit value is reached, a message is generated with the intention of indicating the need to change the filter or carry out a regeneration operation. It is also possible for the quantity of polluting gases taken up by an adsorbent to be checked for maintenance purposes by a sensor (not shown), which is suitable for determining the levels of pollutants that have been adsorbed, being arranged in the gas-carrying passage 11. If the sensor detects a predeterminable limit value for the pollutant(s), a message is likewise generated. The measured values from the manometer 18 and the at least one pollutant sensor are transmitted to an evaluation unit 19, in which they are compared with the predeterminable limit values.

The triggering of the filter regeneration can be effected not only mechanically but also by electrical or optical means, in particular when the fuel cell system is inoperative.

The filtering of the reaction gases retains or removes both particulates and gases, e.g. gritting salt, which is also dissolved and dispersed in the atmospheric humidity. Gritting salt (deicing salt) is, for example, spread in winter and may be a constituent of the air which is sucked in.

The filtering of the reaction gases in accordance with the invention prevents faults in the fuel cell system as a result of pollutants being fed into the fuel cell, and thereby increases the service life or operating time of the fuel cell.

An arrangement of the type described above is advantageously used in a mobile apparatus, such as a vehicle, e.g. a motor vehicle, a locomotive or a boat.

The invention claimed is:

1. A method for purifying gases to be fed to a fuel cell for operation by removing constituents which are unfavorable to the operation of the fuel cell, the method comprising the acts of:
    passing the gas(es) across a filter system, which filter system both separates off particulates and removes constituents in gas or vapor form which have a damaging effect on the operation of the fuel cell;
    feeding the gas(es) to the fuel cell on leaving the filter system, wherein the filter system is regenerateable;
    monitoring the filter system on the basis of criteria indicating a drop in a filter action and a need for regeneration;
    generating a message when the criteria are reached; and
    preventing with a control unit regeneration when the fuel cell is operating.

2. The method as claimed in claim 1, wherein a pressure difference in the filter system is monitored, and measured values from the monitoring act are transmitted to an evaluation unit and compared with a predeterminable limit value, with the message being generated when the predeterminable limit value is reached.

3. The method as claimed in claim 1, wherein an actuating element causes a control unit to initiate and carry out the regeneration.

4. The method as claimed in claim 2, wherein an actuating element causes a control unit to initiate and carry out the regeneration.

5. An arrangement for purifying gases to be fed to a fuel cell for operation by removing constituents which are unfavorable to the operation of the fuel cell, the arrangement comprising:
    a filter system arranged at a location in a gas-carrying passage for feeding the respective gas to the fuel cell, which filter system separates out both particulates and constituents in gas or vapor form that have a damaging effect on operation of the fuel cell;
    wherein the filter system is regenerateable and is monitored on a basis of criteria indicating a drop in a filter action and the need for regeneration, with a message being generated when the criteria are reached; and
    a control unit preventing initiation of regeneration when the fuel cell is operating.

6. The arrangement as claimed in claim 5, further comprising:
    a measuring device for measuring a pressure difference of the filter system, the measured values from the measuring device being transmitted to an evaluation unit and compared with a predeterminable limit value, with a message being generated when the predeterminable limit value is reached.

7. The arrangement as claimed in claim 5, further comprising:
    at least one gas sensor for a polluting gas arranged downstream of the filter system, as seen in a flow direction of the gas, the measured values from the at least one gas sensor being transmitted to an evaluation unit and compared with a predeterminable limit value, with a message being generated when the predeterminable limit value is reached.

8. The arrangement as claimed in claim 6, further comprising:
    at least one gas sensor for a polluting gas arranged downstream of the filter system, as seen in a flow direction of the gas, the measured values from the at least one gas sensor being transmitted to the evaluation unit and compared with a predeterminable limit value, with a message being generated when the predeterminable limit value is reached.

9. The arrangement as claimed in claim 5, wherein the regeneration is triggerable by an actuating element.

10. The arrangement as claimed in claim 6, wherein the regeneration is triggerable by an actuating element.

11. The arrangement as claimed in claim 7, wherein the regeneration is triggerable by an actuating element.

12. The arrangement as claimed in claim 9, further comprising:
    a control unit, which can be acted on by the actuating element in order to initiate and carry out the regeneration and which determines the sequence of regeneration.

13. The arrangement as claimed in claim 10, wherein the control unit is actuatable by the actuating element in order to initiate and carry out the regeneration and to determine the sequence of regeneration.

14. The arrangement as claimed in claim 11, wherein the control unit is actuatable by the actuating element in order to initiate and carry out the regeneration and to determine the sequence of regeneration.

15. The arrangement as claimed in claim 5, wherein the filter system is arranged in the gas-carrying passage upstream of a gas inlet of a compressor.

16. The arrangement as claimed in claim 12, wherein the filter system is arranged in the gas-carrying passage upstream of a gas inlet of a compressor.

17. The arrangement as claimed in claim 5, wherein the filter system is composed of sections, which are connected in series and the filter function of which is matched to a constituent type to be filtered in the gas.

18. The arrangement as claimed in claim 5, wherein a gas fed to the fuel cell is air, an oxygen content of which reacts with a fuel gas in the fuel cell.

19. The arrangement as claimed in claim 5, wherein the filter system has a first filter for particulates, downstream of which there is a second filter with a substance for taking up and binding pollutants in gas or vapor form.

20. The arrangement as claimed in claim 5, wherein the filter system comprises a unit in which a dry filter for particulates and a substance for taking up and binding pollutants in gas or vapor form are arranged together.

21. The arrangement as claimed in claim 5, wherein said arrangement is part of a mobile device.

* * * * *